(12) United States Patent
Lee

(10) Patent No.: US 6,331,098 B1
(45) Date of Patent: Dec. 18, 2001

(54) CORIOLIS TURBULATOR BLADE

(75) Inventor: Ching-Pang Lee, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/466,155

(22) Filed: Dec. 18, 1999

(51) Int. Cl.$^7$ .................. B63H 1/14; F01D 5/08
(52) U.S. Cl. ........................................... 416/97 R
(58) Field of Search ..................... 415/115; 416/97 R

(56) References Cited

U.S. PATENT DOCUMENTS

| | | |
|---|---|---|
| 4,416,585 | 11/1983 | Abdel-Messeh . |
| 4,474,532 | 10/1984 | Pazder . |
| 4,514,144 | 4/1985 | Lee ..................................... 416/96 R |
| 4,515,626 | 5/1985 | Levengood . |
| 4,775,296 | 10/1988 | Schwarzmann et al. . |
| 5,052,889 | 10/1991 | Abdel-Messeh . |
| 5,395,212 | 3/1995 | Anzai et al. .................... 416/97 R |
| 5,403,157 | 4/1995 | Moore ............................. 416/97 R |
| 5,536,143 | * 7/1996 | Jacala et al. .................... 416/96 R |
| 5,681,144 | 10/1997 | Spring et al. ................. 416/97 R X |
| 5,700,132 | * 12/1997 | Lampes et al. ................. 416/97 R |
| 5,797,726 | 8/1998 | Lee ................................. 416/97 R |
| 5,842,829 | * 12/1998 | Cunha et al. ...................... 415/115 |
| 6,174,134 | * 1/2001 | Lee et al. ....................... 416/97 R |

FOREIGN PATENT DOCUMENTS

1410014 * 10/1975 (GB) ................................ 416/97 R

* cited by examiner

Primary Examiner—John E. Ryznic
(74) Attorney, Agent, or Firm—Andrew C. Hess; Rodney M. Young

(57) ABSTRACT

A method of placing turbulators in a turbine rotor blade includes placing slant turbulators in a radial flow channel offset circumferentially from the blade leading edge. The slant turbulators are all inclined radially inward toward the blade trailing edge for directing coolant along the turbulators co-directionally with Coriolis flow inside the offset channel. In a specific embodiment, turbulator chevrons are also placed in a radial flow channel axially aligned with the blade leading edge consistent with the Coriolis flow therein.

20 Claims, 3 Drawing Sheets

CORIOLIS TURBULATOR BLADE

BACKGROUND OF THE INVENTION

The present invention relates generally to gas turbine engines, and, more specifically, to turbine rotor blades therein.

In a gas turbine engine, air is pressurized in a compressor and mixed with fuel in a combustor and ignited for generating hot combustion gases. The gases are channeled to a turbine which extracts energy therefrom for powering the compressor and producing useful work, such as powering a fan for propelling an aircraft in flight.

A high pressure turbine first receives the combustion gases from the combustor and includes a stationary turbine nozzle followed in turn by a row of turbine rotor blades extending radially outwardly from a supporting disk. The nozzle includes airfoil vanes which direct the combustion gases to cooperating airfoils of the blades.

The vanes and blades are hollow and include various cooling circuits therein in which air is diverted from the compressor and used as a coolant for thermally protecting the vanes and the blades. The vane and blade cooling art is quite crowded due to the varying cooling requirements around the airfoils thereof from root to tip and between leading and trailing edges thereof.

The airfoils typically include several cooling circuits extending radially along the span of the airfoil and spaced axially for differently cooling the leading edge, mid-chord, and trailing edge regions of the airfoil.

The coolant channeled through the circuits removes heat by heat transfer convection inside the airfoils and is typically discharged through the pressure and suction sidewalls of the airfoil through film cooling holes which insulate the outer surface of the airfoil against the hot combustion gases which flow thereover.

Internal heat transfer may be increased by providing pins or straight ribs along the sidewalls of the airfoil which define turbulators that trip the coolant flow and locally increase heat transfer. Turbulators are found in various forms and orientations from perpendicular to the direction of coolant flow, as well as inclined relative thereto, as required for individual coolant channels of the different circuits.

Since turbine rotor blades rotate during operation, cooling thereof is rendered even more complex due to the rotary forces imposed upon the coolant. For example, Coriolis force acts upon the coolant flowing through the blades and affects the cooling ability thereof. In a typical radially extending cooling channel, the primary direction of the main coolant flow therethrough is either radially outwardly from root to tip of the blade or radially inwardly from tip to root of the blade, such as found in a typical multi-pass serpentine cooling circuit.

Typical straight turbulators may be orientated along the chords of the airfoil and generally perpendicular to the radial direction of the coolant flow, or may be inclined relative thereto, for correspondingly different performance. In both cases, however, the turbulators are effective for tripping the coolant locally along the inner surface of the airfoil for enhancing heat transfer thereat.

However, the Coriolis force affects cooling performance of the turbulators. The Coriolis force acts on the coolant in a direction perpendicular to the radial flow thereof according to the vector product of the radial velocity of the outwardly or inwardly directed coolant flow through the respective radial flow channels and the rotary speed of the blade about the axial centerline axis of the rotor disk. Accordingly, the Coriolis force acts on the coolant in opposite directions in an outward flow pass or channel as opposed to an inward flow pass or channel.

In both examples, however, the Coriolis force is effective for generating a pair of Coriolis vortices which counterrotate in each radial flow channel as a secondary flow field to the primary radially directed flow of the coolant. Each channel thusly develops a corresponding axially forward Coriolis vortex and an axially aft Coriolis vortex which rotate counter to each other, with different rotation in the inward and outward passes of the flow channels.

In U.S. Pat. No. 5,797,726-Lee turbulator pairs, also referred to as chevrons, are disclosed for cooperating with the Coriolis vortices for enhancing heat transfer cooling inside turbine rotor blades. The chevrons are directed differently along the pressure and suction sidewalls of the blade for cooperating with the Coriolis vortex pair in each cooling passage for locally directing coolant along the chevrons in the same direction as the adjoining Coriolis vortices as opposed to an opposite direction therewith. In this way, the tertiary local flow effect at the chevrons themselves is added to, instead of subtracted from, the secondary Coriolis vortices to prevent flow stagnation and thereby enhance heat transfer cooling inside the blade.

In view of the complexity of turbine airfoils and the directional affect of the Coriolis force, it is desired to further improve turbine blade turbulator design.

BRIEF SUMMARY OF THE INVENTION

A method of placing turbulators in a turbine rotor blade includes placing slant turbulators in a radial flow channel offset circumferentially from the blade leading edge. The slant turbulators are all inclined radially inward toward the blade trailing edge for directing coolant along the turbulators co-directionally with Coriolis flow inside the offset channel. In a specific embodiment, turbulator chevrons are also placed in a radial flow channel axially aligned with the blade leading edge consistent with the Coriolis flow therein.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
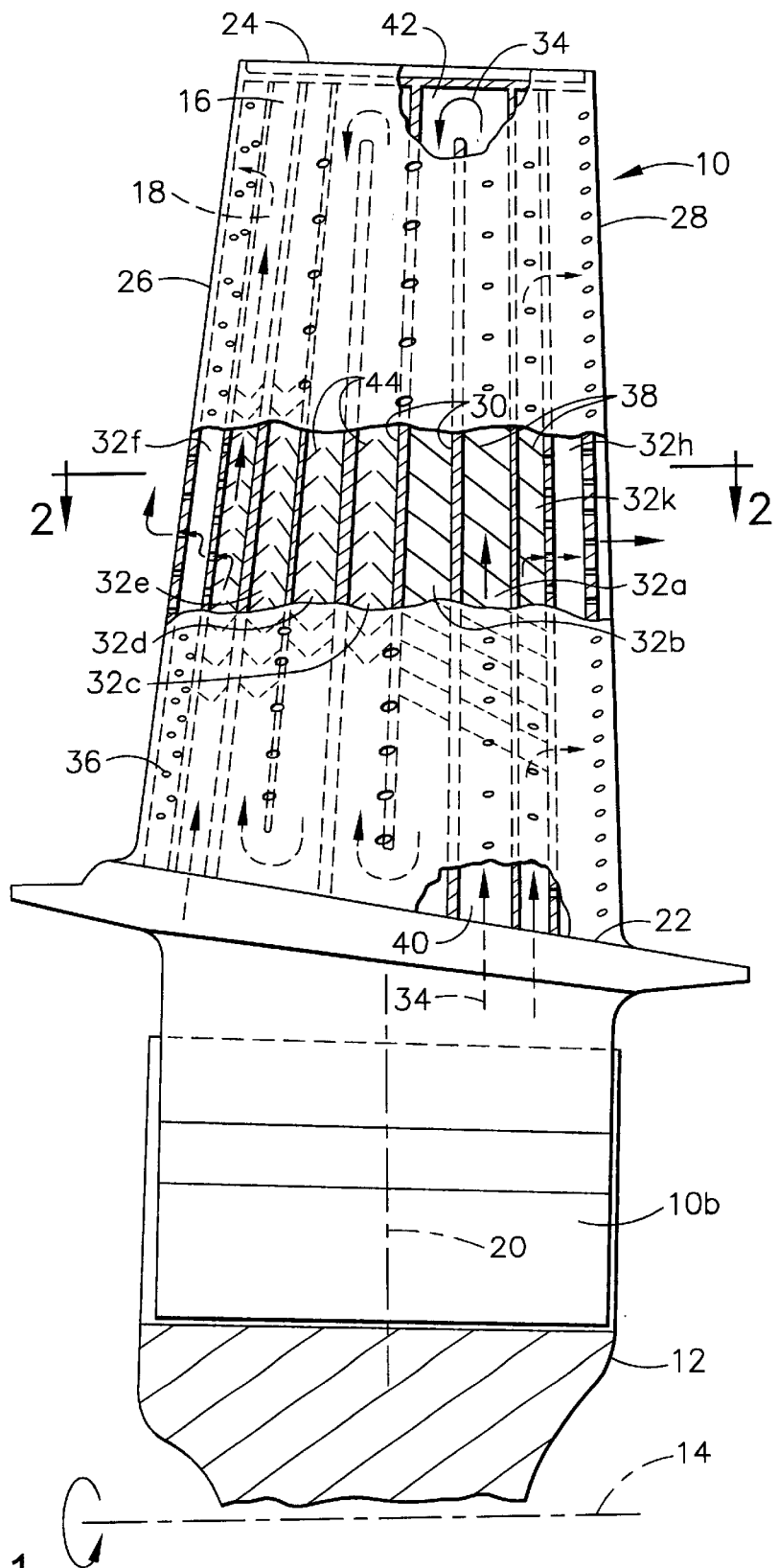
FIG. 1 is a partly sectional, axial elevational view of a turbine rotor blade mounted in a supporting rotor disk in accordance with an exemplary embodiment of the present invention.

Illustrated in side axial view in FIG. 1 is one of several exemplary turbine rotor blades 10 extending radially outwardly from a supporting rotor disk 12. The disk is shown in part and includes an axial centerline or rotary axis 14 about which the disk and blades rotate during operation.

The outer portion of the blade defines an airfoil which extends radially outwardly from an integral dovetail 10b which is conventionally configured to radially retain the blade in a complementary axial dovetail slot in the perimeter of the disk.

Figure 2:
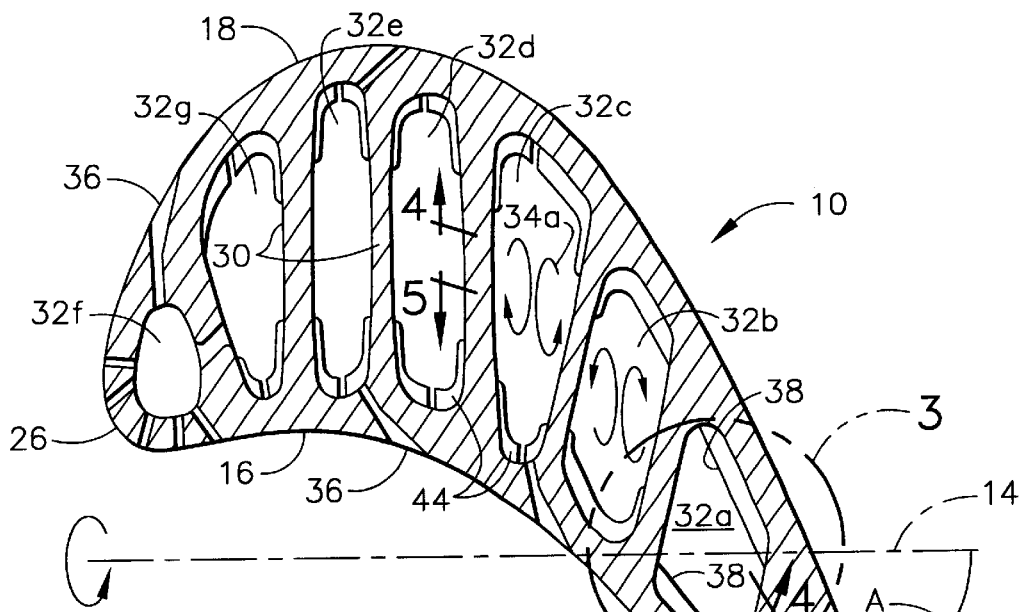
FIG. 2 is a radial sectional view through the blade illustrated in FIG. 1 and taken along line 2—2.

As shown in FIGS. 1 and 2, the blade airfoil includes a generally concave pressure sidewall 16, and a circumferentially or laterally opposite, generally convex suction sidewall 18. The two sidewalls extend longitudinally along a radial axis 20, shown in FIG. 1, from a root 22, defining the radially inner boundary of the airfoil at a corresponding integral platform, to a radially outer tip 24. The sidewalls extend radially along the span of the airfoil, and extend axially in chord between corresponding leading and trailing edges 26, 28.

The sidewalls are also spaced circumferentially or laterally apart between the leading and trailing edges, and are joined together by a plurality of chordally spaced apart integral walls or partitions 30 extending longitudinally in span between the root and tip to define corresponding radial flow passages or channels identified generally by the prefix 32 for channeling coolant 34 therethrough. The coolant is a portion of pressurized air diverted from a compressor (not shown) in a conventional manner for cooling the blades during operation.

The flow channels 32 may be configured in any conventional manner in one or more cooling circuits for channeling the coolant therethrough for cooling the blade by internal convection. In the exemplary embodiment illustrated in FIGS. 1 and 2, the flow channels 32 are conventionally arranged in a five-pass serpentine cooling circuit in the midchord region of the blade in a sequential series of radial flow channels 32a–32e. In the first pass or channel 32a, the coolant flows radially outwardly from root to tip of the blade, and in the second pass 32b the coolant flows radially inwardly from tip to root upon reversing direction below the blade tip. This sequence is repeated in the third channel 32c, fourth channel 32d, and fifth channel 32e alternating outward and inward in the direction of the coolant.

A leading edge cooling circuit includes a leading edge flow channel 32f fed in impingement cooling by an adjoining supply channel 32g. And, a trailing edge cooling circuit includes a trailing edge channel 32h fed in impingement cooling by an adjoining supply channel 32k.

The various cooling circuits may have any conventional configuration, and the blade typically includes various rows of film cooling holes 36 extending through the pressure and suction sidewalls from corresponding flow channels through which the coolant is discharged along the external surface of the blade for providing film cooling thereof.

As shown in FIG. 2, the blade has a substantial amount of twist in this exemplary embodiment in which the trailing edge 28 is circumferentially or laterally offset from the leading edge 26 and precedes the leading edge during circumferential rotation of the blade. The blade twist may be represented by a twist angle A between the suction sidewall 18 and the rotary axis 14 when viewed from above as illustrated in FIG. 2. Blade twist is provided for aerodynamic reasons in a conventional manner and may be limited in some designs, and quite substantial in other designs such as the FIG. 2 embodiment.

One effect of blade twist is that one or more of the flow channels is offset circumferentially or laterally from the leading edge toward the trailing edge. In the exemplary embodiment illustrated in FIG. 2, the flow channel 32b is offset in small part from the leading edge 26; the flow channel 32a is offset in most part from the leading edge; and both trailing edge channels 32k and 32h are offset completely in turn in greater amounts from the leading edge.

Correspondingly, the remaining five channels 32c, 32d, 32e, 32g, 32f are generally axially aligned with each other and the leading edge.

Although the several flow channels 32 are bounded circumferentially by the pressure and suction sidewalls 16,18 and axially or chordally by the partitions 30 extending therebetween, the flow channels subject to blade twist have a skewed orientation relative to the rotary axis 14. The skewed orientation of the four offset channels 32a, b, h, k significantly affects internal convection cooling thereof as opposed to the five axially aligned channels 32c, d, e, g, f.

As shown in FIG. 1, the coolant 34 is initially channeled either radially outward or radially inward through the respective flow channels. Since the blade 10 rotates during operation about the rotary axis 14 and the flow channels bound or confine the main coolant flow therethrough, that radial flow experiences Coriolis force whose direction is the vector product of the coolant flow radial velocity and the blade rotary speed. The direction of the Coriolis force is perpendicular to the velocity vector of the coolant. Since the coolant velocity vector in the outward flow channels is opposite to the velocity vector in the inward flow channels, the direction of the corresponding Coriolis forces are also opposite.

The effect of the Coriolis force is the introduction of secondary flow fields in each of the flow channels which are different for an upflow channel as opposed to a downflow channel. The Coriolis secondary flow in the substantially closed flow channels illustrated in FIG. 2 is observed in the form of a pair of counter-rotating vortices 34a. The twin Coriolis vortices in each flow channel are typically axially aligned with each other, in the form of axially forward and axially aft vortices.

The secondary flow vortices are counterrotating, with the direction of rotation being different for the upflow and downflow channels. For example, in the downflow channel 32b illustrated in FIG. 2 the aft vortex rotates clockwise and the forward vortex rotates counterclockwise. In the upflow channel 32c the aft vortex rotates counterclockwise and the forward vortex rotates clockwise.

In accordance with the present invention, the nature of the Coriolis vortices may be used to complement the twisted configuration of the blade for preferentially introducing otherwise conventional turbulators therein for enhancing turbulator performance and internal cooling, and avoiding decreased performance therefrom.

More specifically, an improved method of placing turbulators in the turbine rotor blade illustrated in FIGS. 1 and 2 includes placing slant turbulators 38 in one or more corresponding rows in at least one of the circumferentially offset channels 32a, b, h, k, with all the slant turbulators in the channel being inclined or slanted radially inward toward the root 22 and trailing edge 28 for directing the coolant along the turbulators co-directionally with the Coriolis flow from the vortices 34a inside the respective offset channels.

Figure 3:
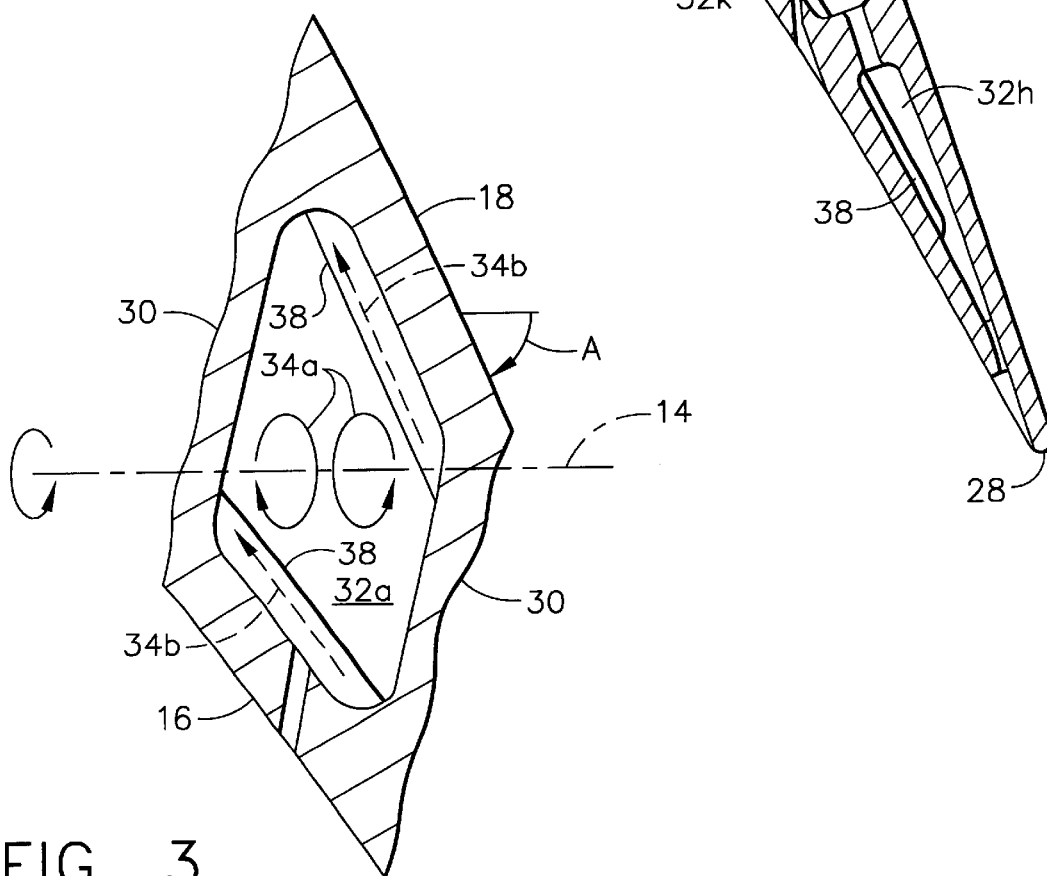
FIG. 3 is an enlarged view of a circumferentially offset radial flow channel illustrated in FIG. 2 within the dashed circle labeled 3.

An exemplary one of the offset channels 32a is illustrated in more detail in FIG. 3. The blade twist A at the exemplary flow channel twists or skews the flow channel in a clockwise direction relative to the axially aligned channels near the leading edge. The pair of Coriolis vortices 34a are illustrated in FIG. 3 with their axially forward and aft relative positions. It is noted that the aft Coriolis vortex, which rotates counterclockwise in the upflow channel 32a, will locally engage the slant turbulator 38 on the suction sidewall 18 in a right-to-left flow orientation as shown. Correspondingly, the forward Coriolis vortex rotates clockwise in the upflow channel 32a and locally engages the slant turbulator 38 on the pressure sidewall 16 in a right-to-left direction.

Accordingly, the slant turbulators 38 are specifically configured and inclined to complement the corresponding Coriolis vortices which directly affect their performance to promote and direct tertiary local coolant flow 34b along the corresponding turbulators co-directionally with the secondary Coriolis flow inside the offset channels in which the primary coolant flow is either outward or inward.

Figure 4:
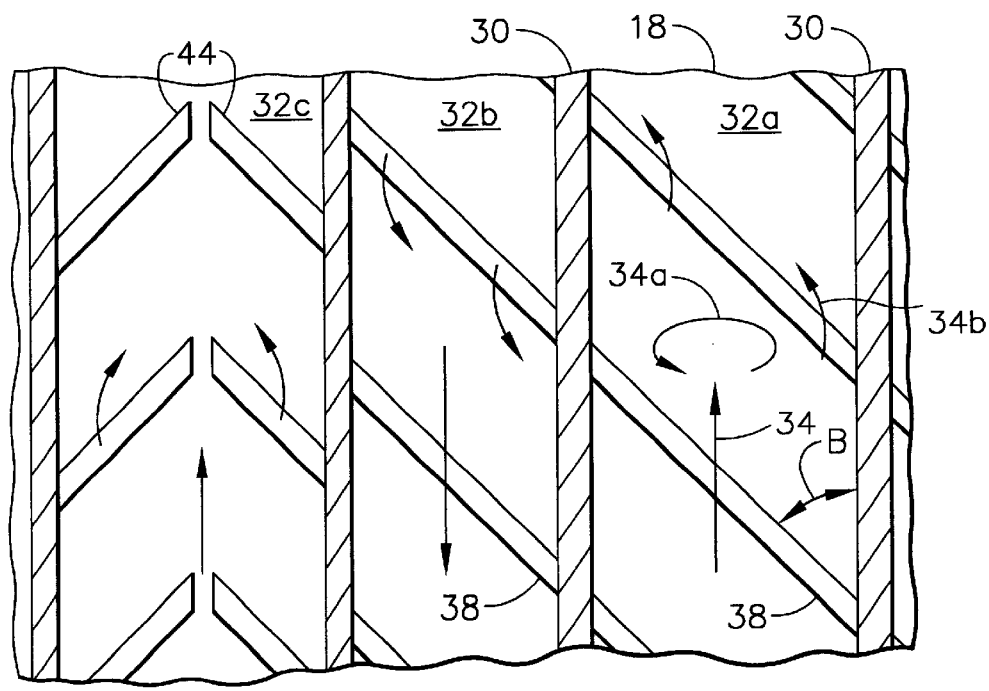
FIG. 4 is an enlarged elevational sectional view of an internal portion of the suction sidewall of the blade illustrated in FIG. 2 and taken along line 4—4.
Figure 5:
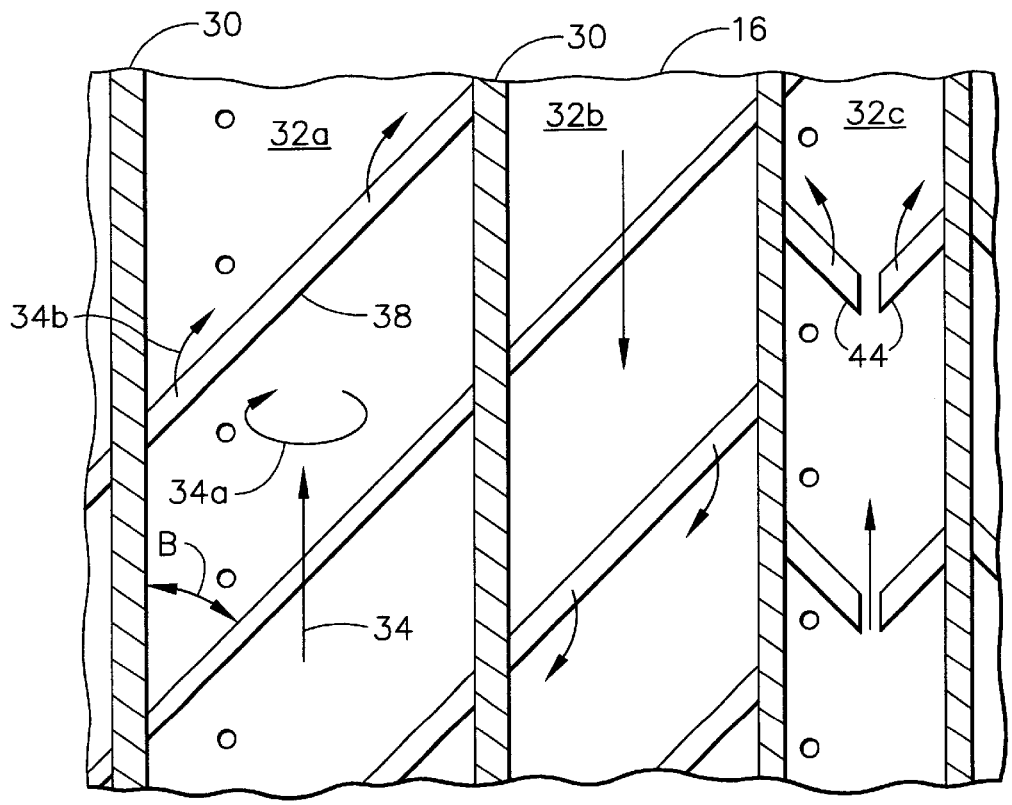
FIG. 5 is an enlarged sectional view through an internal portion of the pressure sidewall of the blade illustrated in FIG. 2 and taken along line 5—5.

An exemplary embodiment of the slant turbulators 38 is shown in side elevation view in FIG. 4 for the suction sidewall 18, and in FIG. 5 for the cooperating pressure sidewall 16. Each of the turbulators 38 is preferably straight and extends between the corresponding axially forward and aft partitions 30 which axially bound the flow channel 32a. Each turbulator is slanted or inclined at an acute inclination angle B positioning the axially aft end of the turbulator which faces the blade trailing edge radially inwardly of the axially forward end of the turbulator which faces the leading edge. Each turbulator 38 is preferably continuous between the two partitions 30. In alternate embodiments (not shown), the individual turbulators may be axially segmented although still colinearly aligned for collectively effecting the desired turbulator configuration and slant.

FIG. 4 illustrates the upflow coolant 34 inside the suction sidewall 18 which effects the counterclockwise rotating aft Coriolis vortex that cooperates with the specifically slanted turbulator 38 for tripping the coolant and locally directing the turbulator flow 34b in generally the same direction as the aft Coriolis vortex along the suction side.

Similarly, FIG. 5 illustrates the upflow coolant 34 inside the pressure sidewall 16 with the corresponding clockwise rotating Coriolis vortex. The slant turbulator 38 is preferentially slant to locally trip and direct the turbulator flow 34b co-directionally with the forward Coriolis vortex along the pressure side.

The two rows of slant turbulators 38 on the opposing pressure and suction sidewalls inside the upflow channel 32a as illustrated in FIGS. 4 and 5 preferably have similar inclination angles B which may be about 30 degrees to about 60 degrees. The opposing turbulators may be radially aligned with each other or radially offset as desired.

And, quite significantly, the slant turbulators 38 have the same inclination along the entire axial extent of the corresponding sidewalls inside the flow channel between the bounding partitions 30. Due to the substantial twist angle A of the blade at the flow channel 32a, the aft Coriolis vortex adjoins primarily only the suction sidewall 18, and the forward Coriolis vortex adjoins primarily only the pressure sidewall 16.

As the degree of twist angle A increases from flow channel to flow channel toward the blade trailing edge 28 as illustrated in FIG. 2, the aft Coriolis vortex increases its affect on the suction sidewall and decreases its affect on the pressure sidewall, and correspondingly, the forward Coriolis vortex increases its affect on the pressure sidewall and decreases its affect on the suction sidewall.

The significance of the preferred alignment of the slant turbulators 38 inside the offset flow channels and the Coriolis vortices developed therein may be additionally appreciated referring to FIG. 4. If the slant turbulators 38 illustrated therein were inclined oppositely, with an inclination angle B of 120–150 degrees, the direction of the local Coriolis vortex would be opposite to the local tripping of the coolant along the turbulator which would then be to the right in FIG. 4, instead of to the left as shown. The local flow effected by the slant turbulator would then oppose the local Coriolis vortex flow reducing the local coolant flow velocity and correspondingly locally reducing heat transfer.

However, in the preferred embodiment illustrated in FIG. 4, the slant turbulators direct the coolant locally in the same direction as the Coriolis vortex with the velocities thereof being additive for locally increasing heat transfer coefficient.

The exemplary upflow channel 32a illustrated in FIG. 1 includes a bottom inlet 40 near the blade root 22 which receives the coolant 34 through the dovetail 10b in a conventional manner. The coolant is then channeled outward through the flow channel 32a toward the blade tip 24. The slant turbulators 38 are inclined radially inwardly toward the trailing edge for preferentially cooperating with the Coriolis vortices as disclosed above.

Since the second pass serpentine flow channel 32b illustrated in FIG. 1 also experiences substantial twist, as shown in FIG. 2, it preferably also includes the similarly inclined slant turbulators 38 therein. In this embodiment, however, the flow channel 32b includes a top inlet 42 in the form of a reverse bend which redirects the coolant 34 radially inwardly from the first pass flow channel 32a. The top inlet 42 is disposed near the blade tip 24 for channeling the coolant radially inward toward the blade root 22. As shown in FIGS. 4 and 5, the similarly inclined slant turbulators 38 in the two channels 32a and 32b cooperate with the corresponding Coriolis vortices generated in those channels for enhancing heat transfer cooling during operation in a similar manner.

The corresponding partitions 30 defining the first two serpentine flow channels 32a,b having substantial twist are preferably imperforate, and strong Coriolis vortices are thusly generated therein which are complemented by the cooperating slant turbulators. The trailing edge supply channel 32k also experiences significant twist and may similarly include the slant turbulators 38.

The aft partition of the supply channel 32k includes a row of small impingement holes which discharge the coolant inside the pressure sidewall of the trailing edge flow channel 32h. Since the partition holes are relatively small with substantial pressure drop, Coriolis vortices may still be generated in the supply channel 32k for which the introduction of the slant turbulators may be used to increase heat transfer cooling therein.

As illustrated in FIG. 2, the trailing edge flow channel 32h is situated in the narrowest portion of the blade subject to the greatest amount of blade twist. In view of the limited space, a row of the slant turbulators 38 may be incorporated only inside the pressure sidewall thereof for cooperating with the respective Coriolis vortex formed therein for enhanced cooling. The suction side of the channel may remain smooth without turbulators. The slant turbulators 38 may therefore be incorporated on at least one of the blade sidewalls, such as the pressure sidewall 16, in the trailing edge flow channel 32h to advantage.

And, where space permits within any one of the offset flow channels, the turbulators 38 are preferably disposed along both the pressure and suction sidewalls in oppositely facing rows having the same or similar radially inward inclinations toward the trailing edge.

As indicated above, the introduction of the slant turbutators 38 is preferably made in only those flow channels experiencing lateral or circumferential offset from the blade leading edge due to the blade twist. For example, the slant turbulators 38 are preferred when the blade twist angle A exceeds about 45 degrees and positions the pressure sidewall 16 and turbulators thereon of the corresponding offset flow channel in most part closer to the blade leading edge 26 than the opposite suction sidewall 18 at the same channel. This is shown in FIG. 2 for the four offset flow channels 32a, b, h, k in which the portions of the pressure sidewalls thereof are located axially forwardly in various amounts from the corresponding portions of the suction sidewalls of those channels.

As shown in the three flow channels 32a, b, k in FIG. 2, the corresponding slant turbulators 38 therein inside the opposite pressure and suction sidewalls thereof axially overlap each other centrally, with the turbulators on the suction sidewall extending aft from the central overlap toward the trailing edge 28, and the turbulators on the pressure sidewall extending forward from the central overlap toward the leading edge 26. The amount of axial overlap of the opposing turbulators in each of the offset flow channels decreases as the blade twist angle increases up to a maximum twist angle of about 70 degrees in the exemplary embodiment illustrated.

FIG. 2 clearly illustrates the increasing distortion or skewing of the aft-most flow channels due to the correspondingly large amount of blade twist. The corresponding flow channels are nevertheless generally quadrilateral in radial section with corresponding pairs of Coriolis vortices being formed therein during operation and positioned axially forward and aft therein. The significance of the blade twist and its cooperation with the Coriolis vortices may additionally be appreciated upon examination of the forward-most axially aligned flow channels which do not have appreciable lateral offset or twist.

Whereas only the slant turbulators 38 are desired for the offset flow channels illustrated in FIG. 2, it is additionally desired to place corresponding rows of only turbulator chevrons 44 in one or more of the flow channels 32c, d, e, g axially aligned with the blade leading edge 26 without significant blade twist. The axially aligned flow channels are disposed forward of the offset flow channels in alignment with the leading edge which exposes each of the pressure and suction sidewall portions thereof to both Coriolis vortices in each of the aligned channels.

Exemplary rows of the turbulators chevrons 44 are illustrated in more detail in FIGS. 4 and 5 for the third serpentine pass, upflow channel 32c. Each turbulator chevron 44 includes a pair of ribs inclined from opposing partitions to converge and point toward an apex in the form of a common breech in the ribs through which the coolant may flow. These turbulator chevrons are conventional and described in substantial detail in U.S. Pat. No. 5,797,726-Lee incorporated herein by reference.

The chevrons 44 are disposed inside one or more of the axially aligned flow channels, such as channel 32c, along both the pressure and suction sidewalls 16, 18 for locally directing the coolant flow along the chevrons co-directionally with the Coriolis flow inside the flow channel. As shown in FIG. 2, the turbulator chevrons 44 are disposed inside the flow channel 32c on both sidewalls thereof with the chevrons on the suction sidewall 18, as illustrated in FIG. 4, pointing radially outward toward the tip; and the chevrons on the pressure sidewall 16, as illustrated in FIG. 5, pointing radially inward toward the root.

As initially shown in FIG. 2, the turbulator chevrons on both sidewalls correspondingly cooperate with respective ones of the forward and aft Coriolis vortices developed in the flow channel 32c. The counterclockwise aft vortex cooperates with the right half of the suction-side chevron for co-direction of the flow components, and similarly with the right half of the pressure-side chevron. Correspondingly, the clockwise forward Coriolis vortex cooperates with the left-half chevrons on the pressure and suction sidewalls for co-direction of the coolant flow components thereof.

In view of the different orientation of the axially aligned forward flow channels 32c, d, e, g as opposed to the laterally offset aft flow channels 32a, b, h, k either turbulator chevrons or slant tabulators are used therein, and not vice versa. Since the forward and aft Coriolis vortices in the axially aligned forward flow channels similarly affect both the pressure and suction sidewalls of the blade, solely the turbulator chevrons 44 are preferred therein for maximizing heat transfer without undesirable flow stagnation between the turbulators and Coriolis vortices.

Accordingly, the slant turbulators of the offset flow channels are specifically excluded from being used in the axially aligned forward channels since their common inclination would promote flow with the aft Coriolis vortex but would degrade flow with the forward Coriolis vortex. Since the two Coriolis vortices act with different local direction on each of the pressure and suction sidewalls in the forward channels, the singly inclined slant turbulators would not complement the Coriolis vortices in the forward channels, and would fail to maximize heat transfer cooling capability.

Correspondingly, the turbulator chevrons 44 of the forward flow channels are preferably excluded from use in the aft, laterally offset flow channels for similar reasons. Since the aft Coriolis vortex has maximum affect on the suction sidewall with little affect on the pressure sidewall, and the forward Coriolis vortex has maximum affect on the pressure sidewall with little affect on the suction sidewall, only the singly inclined slant turbulators 38 are preferred in the aft channels. The use of the turbulator chevrons in the offset aft channels would fail to maximize heat transfer performance of the Coriolis vortices therein.

For example, although the aft Coriolis vortex would complement the right half of the suction-side chevron, it would effect degraded performance from the left half portion of that chevron. Similarly, the forward Coriolis vortex would complement the left half of the pressure-side chevron, and effect degraded performance from the right half portion thereof.

Accordingly, by the preferential use of the slant turbulators in the circumferentially offset flow channels, and the turbulator chevrons in the axially aligned flow channels maximum performance advantage of the corresponding Coriolis vortices generated therein can be obtained. The slant turbulators and chevrons are thusly specifically tailored in configuration to match the main flow direction of the coolant through the upflow and downflow flow channels with the secondary flow circulation caused by the Coriolis force.

The Coriolis vortices generated during operation will cooperate with the respective turbulators for continuously circulating the local coolant along the inside walls of the passages to enhance the heat transfer therein. By ensuring the co-directional flow of the Coriolis vortices with local flow along the respective turbulators, flow stagnation is reduced or eliminated for maximizing heat transfer cooling capability to locally complement the Coriolis vortices irrespective of the twist or skew of the different flow channels.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbine rotor blade comprising:

pressure and suction sidewalls extending longitudinally in span from root to tip, and extending in chord between leading and trailing edges;

said sidewalls being spaced laterally apart between said leading and trailing edges, and joined together by chordally spaced apart partitions extending longitudinally between said root and tip to define a flow channel for channeling a coolant therethrough; and said blade having twist to offset laterally said channel from said leading edge toward said trailing edge, and said channel having a row of slant turbulators spaced apart longitudinally and all inclined inward toward said root and trailing edge for directing said coolant along said turbulators co-directionally with Coriolis flow inside said channel.

2. A blade according to claim 1 wherein said turbulators extend straight between said partitions.

3. A blade according to claim 2 wherein said turbulators are continuous between said partitions.

4. A blade according to claim 2 wherein said channel includes a bottom inlet near said root for channeling said coolant upward toward said tip.

5. A blade according to claim 2 wherein said channel includes a top inlet near said tip for channeling said coolant inward toward said root.

6. A blade according to claim 2 wherein said turbulators are disposed inside said channel along both said pressure and suction sidewalls.

7. A blade according to claim 6 wherein said blade twist exceeds 45 degrees to position said pressure sidewall at said channel in most part closer to said leading edge than said opposite suction sidewall at said channel.

8. A blade according to claim 7 wherein said blade twist at said channel is about 70 degrees.

9. A blade according to claim 7 wherein said turbulators inside said opposite pressure and suction sidewalls overlap each other centrally, with said turbulators on said suction sidewall extending aft therefrom toward said trailing edge and said turbulators on said pressure sidewall extending forward therefrom toward said leading edge.

10. A blade according to claim 6 further comprising:

another flow channel disposed forward of said offset channel and aligned with said leading edge; and respective rows of turbulator chevrons disposed inside said aligned channel along said pressure and suction sidewalls with said pressure-side chevrons pointing outward toward said tip, and said suction-side chevrons pointing inward toward said root.

11. A method of placing turbulators in a turbine rotor blade having internal radial flow channels bounded circumferentially by pressure and suction sidewalls and axially by partitions extending therebetween, with said blade having twist to circumferentially offset a trailing edge of said blade from a leading edge thereof, said method comprising:

placing turbulator chevrons in one of said channels axially aligned with said leading edge for directing coolant flow along said chevrons co-directionally with Coriolis flow inside said aligned channel; and placing slant turbulators in one of said channels offset circumferentially from said leading edge toward said trailing edge, and all inclined radially inward toward said trailing edge for directing said coolant along said turbulators co-directionally with Coriolis flow inside said offset channel.

12. A method according to claim 11 further comprising excluding said slant turbulators from said aligned channel, and excluding said chevrons from said offset channel.

13. A method according to claim 11 further comprising:

placing said chevrons inside said aligned channel on both sidewalls thereof; and placing said slant turbulators inside said offset channel on at least one of said sidewalls thereof.

14. A method according to claim 13 further comprising pointing said suction-side chevrons radially outward, and said pressure-side chevrons radially inward.

15. A method according to claim 14 further comprising placing said slant turbulators inside said offset channel on both said sidewalls thereof, with both said suction-side and pressure-side turbulators being inclined radially inward toward said trailing edge.

16. A turbine rotor blade comprising:

internal radial flow channels bounded circumferentially by pressure and suction sidewalls and axially by partitions extending therebetween, with said blade having twist to circumferentially offset a trailing edge of said blade from a leading edge thereof;

a row of turbulator chevrons disposed in one of said channels axially aligned with said leading edge for directing coolant flow along said chevrons co-directionally with Coriolis flow inside said aligned channel; and a row of slant turbulators disposed in one of said channels offset circumferentially from said leading edge toward said trailing edge, and all inclined radially inward toward said trailing edge for directing said coolant along said turbulators co-directionally with Coriolis flow inside said offset channel.

17. A blade according to claim 16 wherein:

said chevrons are disposed inside said aligned channel on both sidewalls thereof; and said turbulators are disposed inside said offset channel on at least one of said sidewalls thereof.

18. A blade according to claim 17 wherein said suction-side chevrons point radially outward and said pressure-side chevrons point radially inward.

19. A blade according to claim 18 wherein said turbulators are disposed inside said offset channel on both said sidewalls thereof, with both said suction-side and pressure-side turbulators being inclined radially inward toward said trailing edge.

20. A blade according to claim 19 wherein said turbulators extend straight and are continuous between said partitions.

* * * * *